UNITED STATES PATENT OFFICE.

CLARA M. KIMBALL, OF MILWAUKEE, WISCONSIN.

COMPOSITION FOR MEDICATING BED-QUILTS.

SPECIFICATION forming part of Letters Patent No. 348,748, dated September 7, 1886.

Application filed November 17, 1885. Serial No. 1-3,113. (No spe imens.)

*To all whom it may concern:*

Be it known that I, CLARA M. KIMBALL, of Milwaukee, in the county of Milwaukee, and in the State of Wisconsin, have invented certain new and useful Improvements in Composition for Medicating Quilts; and I do hereby declare that the following is a full, clear, and exact description thereof.

My invention relates to medicated bed-coverings; and it consists in a composition of matter for interposition between the layers of a quilt, as hereinafter fully set forth.

Primarily the quilt consists of suitable fabric in two layers with medicated cotton batting interposed between them. It is immaterial of what the said layers consist, and they may be of silk, worsted, linen, cotton, or any other fabric or combination of fabrics desired. The cotton batting should be of the very best quality, and ordinarily I would use three layers or sheets thereof, the center sheet only being medicated. This sheet I immerse in a solution of five parts carbolic acid and ten parts spirits of ammonia to one hundred parts of cold water mixed with a little alcohol, about two quarts of water being necessary to one and a half pounds of cotton batting. After the batting is thoroughly saturated I dry it, and then add a mixture consisting of three (3) drams of gum-camphor and one (1) dram of thymol pulverized, which may be either sprinkled upon the batting, or sachets containing these substances can be placed thereon, and then the medicated sheet is placed between the other sheets of batting and these between the upper and lower fabrics of the quilt, and the whole stitched together in the ordinary manner of forming quilts.

I am aware that a composition consisting of camphor dissolved in carbolic acid, mixed with rain-water, common salt, and aqua-ammonia has been heretofore used for driving away mosquitoes, flies, fleas, and other insects from the person, house, office, &c., and also as a disinfectant and preventive for cholera and small-pox, and as a lotion for rheumatism, frozen limbs, &c., as well as for sprains and bruises, and as a wash for fruit-trees to keep off borers, &c.; and such I do not claim; but,

Having thus described my invention, what I claim as new, and desire to secure by Letters Patent, is—

A composition of matter for interposition between the layers of a quilt, consisting of cotton batting impregnated with carbolic acid, ammonia, gum-camphor, and thymol, substantially as set forth.

In testimony that I claim the foregoing I have hereunto set my hand, at Milwaukee, in the county of Milwaukee and State of Wisconsin, in the presence of two witnesses.

CLARA M. KIMBALL.

Witnesses:
H. G. UNDERWOOD,
MAURICE F. FREAR.